(12) United States Patent
Karnalkar et al.

(10) Patent No.: US 9,992,347 B2
(45) Date of Patent: *Jun. 5, 2018

(54) METHOD AND APPARATUS FOR MANAGING CONFERENCE CALLS

(71) Applicant: AT&T INTELLECTUAL PROPERTY I, L.P., Atlanta, GA (US)

(72) Inventors: Anup D Karnalkar, Allen, TX (US); R. Tyler Wallis, Greenwood Village, CO (US); William Stanley Robbins, Sun Prairie, WI (US); Susan Steele, Phillipsburg, GA (US); Mark Ryan, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/436,979

(22) Filed: Feb. 20, 2017

(65) Prior Publication Data
US 2017/0163812 A1   Jun. 8, 2017

Related U.S. Application Data

(63) Continuation of application No. 12/275,694, filed on Nov. 21, 2008, now Pat. No. 9,615,146.

(51) Int. Cl.
| | |
|---|---|
| *H04M 3/42* | (2006.01) |
| *H04M 3/56* | (2006.01) |
| *H04M 7/00* | (2006.01) |
| *H04N 7/15* | (2006.01) |

(52) U.S. Cl.
CPC ........... *H04M 3/567* (2013.01); *H04M 7/006* (2013.01); *H04N 7/15* (2013.01)

(58) Field of Classification Search
CPC ......... H04M 3/567; H04M 7/006; H04N 7/15
USPC ..................................... 379/202.01; 709/204
See application file for complete search history.

(56) References Cited

U.S. PATENT DOCUMENTS

| | | |
|---|---|---|
| 7,546,301 B1 | 6/2009 | Balachandran |
| 2002/0033880 A1 | 3/2002 | Sul et al. |
| 2002/0106998 A1 | 8/2002 | Presley et al. |
| 2003/0231600 A1 | 12/2003 | Polomski et al. |
| 2004/0131167 A1 | 7/2004 | Chang et al. |
| 2006/0029050 A1 | 2/2006 | Harris et al. |
| 2006/0293073 A1 | 12/2006 | Rengaraju et al. |
| 2007/0033251 A1 | 2/2007 | Mandalia et al. |
| 2008/0002022 A1 | 1/2008 | VanEpps et al. |
| 2008/0276068 A1 | 11/2008 | Ashraf et al. |
| 2009/0028179 A1 | 1/2009 | Albal |
| 2009/0190603 A1 | 7/2009 | Damola et al. |

*Primary Examiner* — Quynh Nguyen
(74) *Attorney, Agent, or Firm* — Guntin & Gust, PLC; Jay H. Anderson (57) ABSTRACT

A system that incorporates teachings of the present disclosure may include, for example, a communication device having a controller to retrieve from an address book a communication identifier for each of a plurality of participants, determine from the address book a conferencing type for each of the plurality of participants, and initiate according to the conference type and the communication identifier of each participant a Voice over Internet Protocol conference call directed to communication devices of the plurality of participants. Other embodiments are disclosed.

20 Claims, 6 Drawing Sheets

METHOD AND APPARATUS FOR MANAGING CONFERENCE CALLS

CROSS-REFERENCE TO RELATED APPLICATIONS

This application is a continuation of U.S. application Ser. No. 12/275,694, filed Nov. 21, 2008, which is incorporated herein by reference in its entirety.

FIELD OF THE DISCLOSURE

The present disclosure relates generally to communication techniques and more specifically to a method and apparatus for managing conference calls.

BACKGROUND

Three-way calling is a common feature provided by telecommunication service providers. Users of this feature can expand a three party call when each user having the feature joins other parties. This approach, however, can take time and require coordination. Some service providers have provided a more convenient approach with a dial-in conference number. With this service, participants can dial into a single number with relative ease.

DETAILED DESCRIPTION

One embodiment of the present disclosure can entail a communication device having a controller to retrieve from an address book a communication identifier for each of a plurality of participants, determine from the address book a conferencing type for each of the plurality of participants, and initiate according to the conference type and the communication identifier of each participant a Voice over Internet Protocol (VoIP) conference call directed to communication devices of the plurality of participants. The conferencing type can indicate whether the participant can participate in a video conference or only an audio conference.

Another embodiment of the present disclosure can entail a computer-readable storage medium having computer instructions to determine from an address book a conferencing type for each of a plurality of participants, and initiate according to the conference type and the communication identifier of each participant a video-only, voice-only, or combination conference call directed to communication devices of the plurality of participants.

Yet another embodiment of the present disclosure can entail initiating a video-only conference call, a voice-only conference call, or a combination thereof with at least one participant responsive to determining from an address book a conferencing type for each of a plurality of participants.

Figure 1:
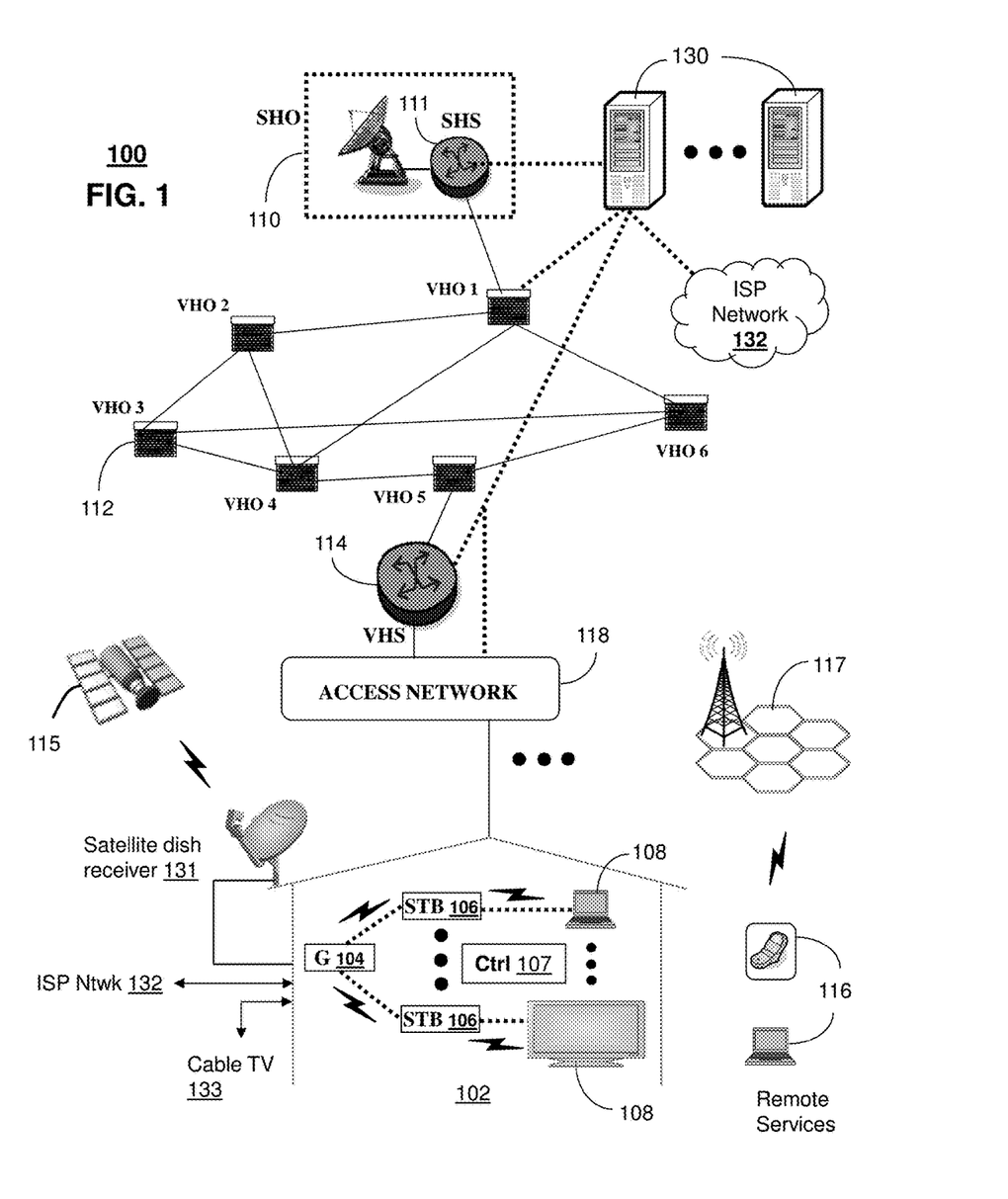
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 114 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the one or more computing devices 130 can be used as a presence system 130 (herein referred to as presence system 130) for collecting presence information associated with users of the first communication system 100. Presence information can indicate for example the whereabouts of users as well as the communication devices in use by these users. The whereabouts of a user can be determined from GPS coordinates transmitted by communication devices of the users to the presence system 130, or from triangulation analysis performed from data provided by base stations such as reference 117. The presence system 130 can determine which communication devices are in use by a particular user by monitoring network activity generated thereby, or from status information provided by the communication devices. The presence system 130 can for example determine from network activity derived from common network elements such as switches or routers that a user is working from a computer terminal at his/her office, using a cellular phone, office phone, home phone, or otherwise. The presence system 130 can make a similar determination by polling communication devices of the user to determine their state of usage.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
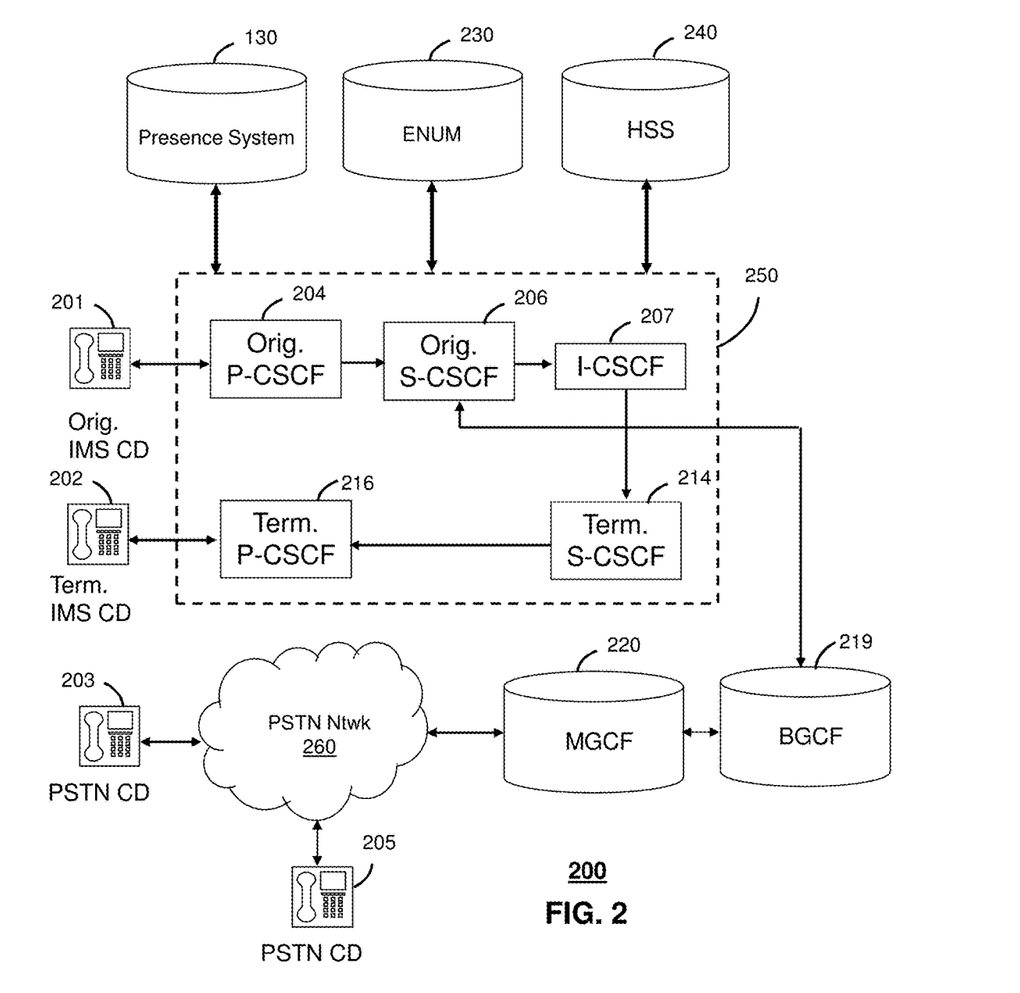

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The presence system 130 of FIG. 1 can be operably coupled to the second communication system 200 for purposes similar to those described above.

Figure 3:
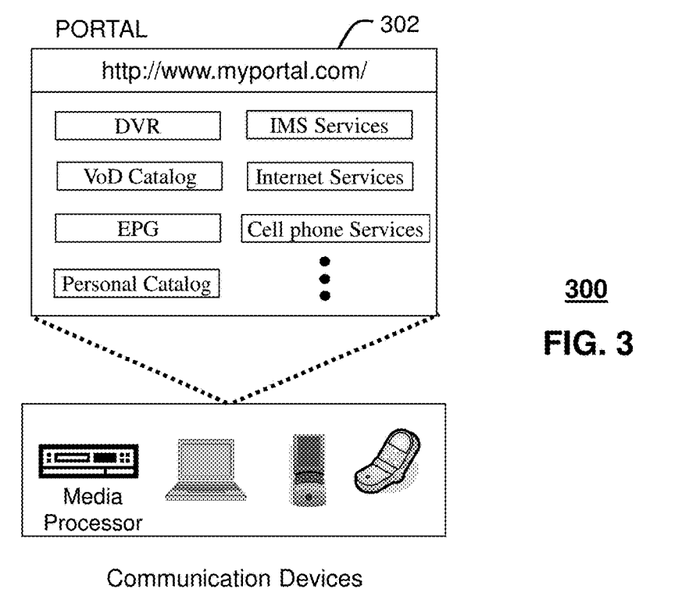
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
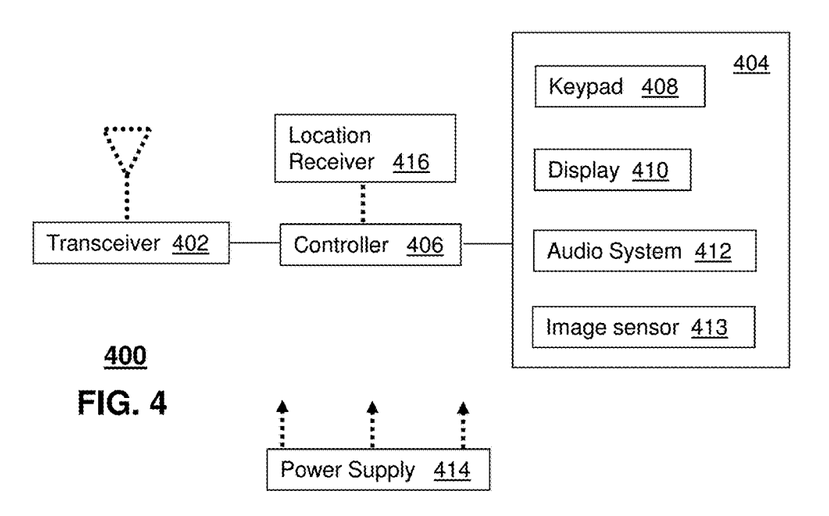
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VOID, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
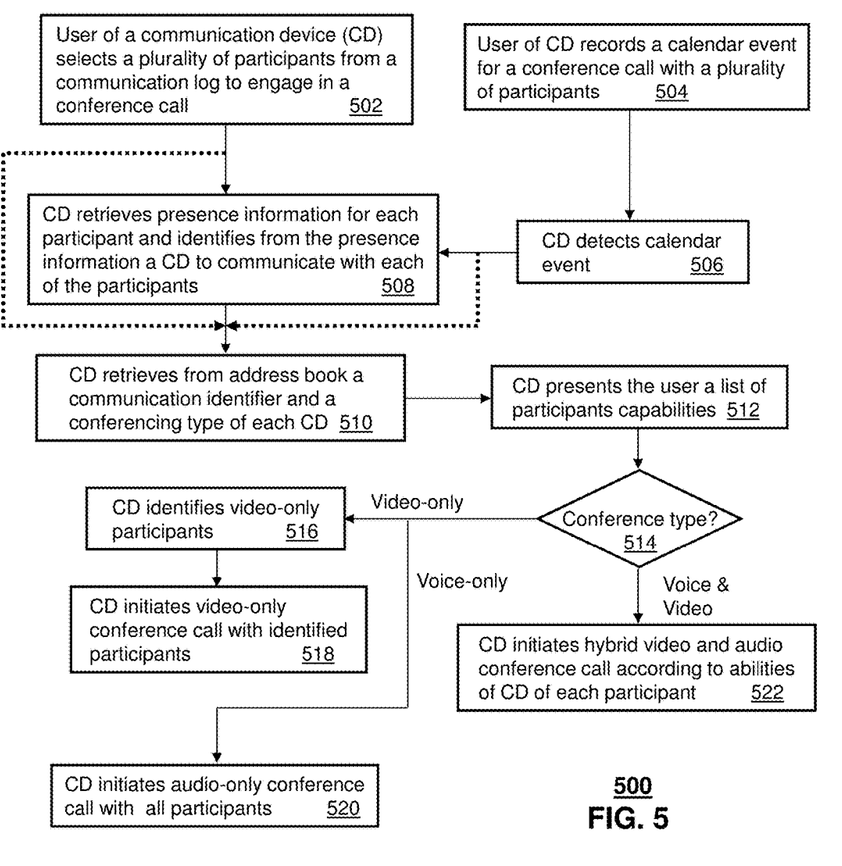
FIG. 5 depicts an illustrative embodiment of a method according to the present disclosure.
Figure 6:
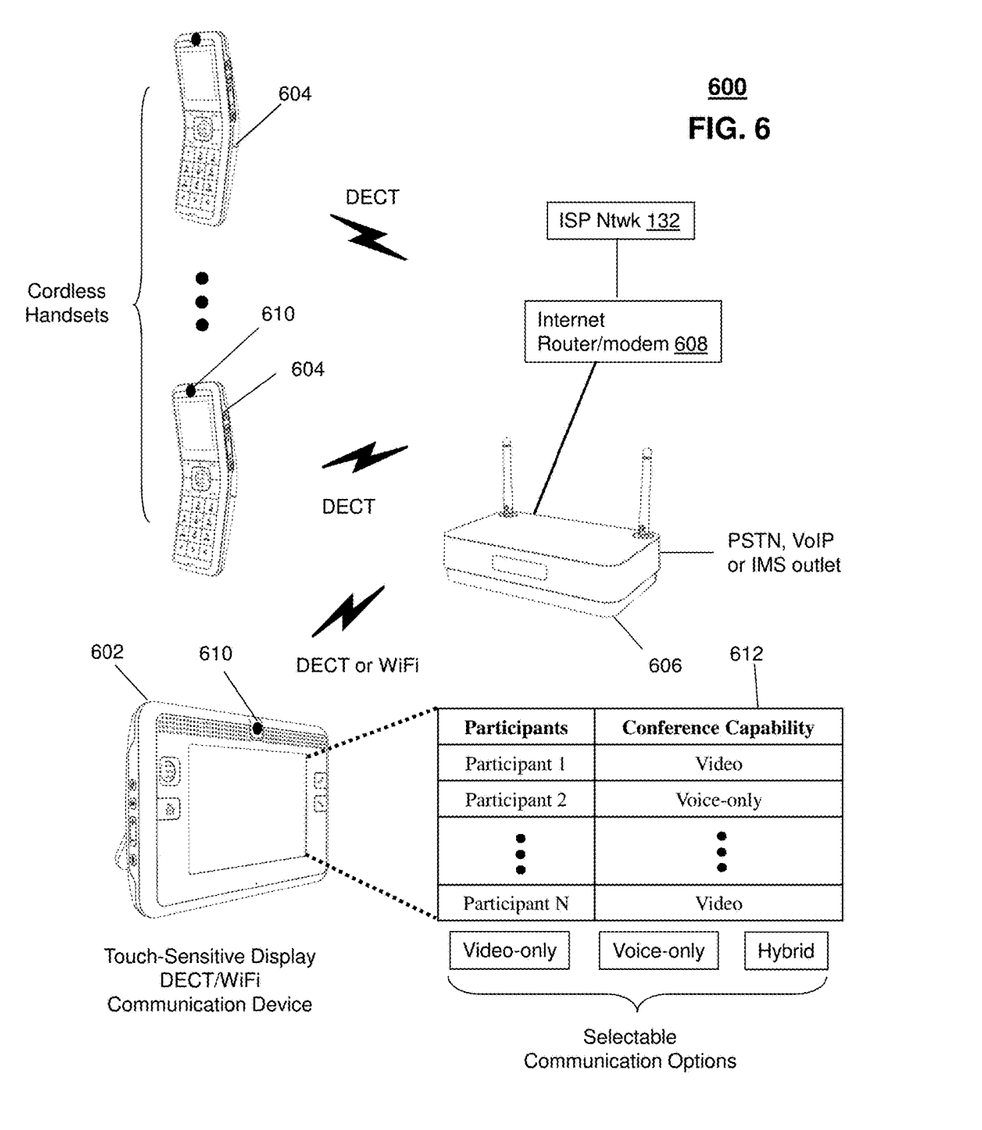
FIG. 6 depicts an illustrative embodiment of a block diagram of communication devices operating according to the method of FIG. 5.

FIG. 5 depicts an illustrative method 500 for managing conference calls. FIG. 6 depicts an illustrative embodiment of a block diagram 600 of communication devices operating according to method 500. Block diagram 600 comprises a communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of the DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can also include communication technology for communicatively interfacing to the ISP network 132 of FIG. 1 by way of a common Internet/router modem 608. The base unit 606 can provide the cordless handsets voice communication services, and the tablet 602 a combination of voice and data communication services. The tablet 602 and cordless handsets 604 can be equipped with common camera sensors 610 (such as charged coupled device sensors) which can enable these devices to support video communication services.

With the configuration of FIG. 6 in mind, method 500 can begin with step 502 in which a user of one of the communication devices of FIG. 6 selects a plurality of parties from a communication log to engage in a conference call with the parties as participants. The communication device referred to in this instance can be one of the cordless handsets 604 or the tablet 602. The communication log can represent either a dialed calls log, received calls log, or a combination thereof. The user can highlight by means of a user interface (UI) of the communication device entries in a received or dialed call entry.

The UI of the communication device can for example support a mouse pointer function which allows the user to select more than one entry in a log. The user can signal the communication device, for example, that more than one entry is to be selected by depressing a control button on a Qwerty keyboard presented by the display of the tablet 602 while selecting multiple participants. Alternatively, the UI can present the user in the communication log a button (e.g., such as "Multi-party") which when selected signals the communication device that multiple selections will follow. Thus each selection the user makes, highlights an entry in the call log. If the user selects a highlighted entry again, the selection can be de-highlighted, thereby making the selection process a toggle function.

The user can highlight more than one entry in either log, and then initiate a request for a multi-party call by selecting a send button on the phone as one would commonly do in a single number dialing process. Highlighting more than one entry in the logs can indicate to the communication device (602 or 604) that the actions taken represent a conference call.

In another embodiment, the user can direct the communication device in step 504 to record a calendar notice for a conference call with a plurality of attendees (or participants). The calendar notice can be accepted by the participants which can also be recorded by the communication device. When the communication device detects a trigger of the calendar event in step 506, the communication device can once again detect a multi-party conference call based on the listed participants in the calendar notice.

Upon detecting a multi-party call in step 502 originating from the communication logs, or the calendar event in step 506 also initiating a conference call with multiple parties, the communication device can proceed to step 508 as an intermediary step before initiating a conference call. In step 508, the communication device can retrieve from the presence system 130 presence information for each participant. In the case of the table 602 this step can represent a communication exchange with the presence system 130 over the data connection provided by the base unit 606 over the WiFi air interface. The presence information can indicate to the communication device the availability of each participant to accept a call, and which communication device of the targeted participant can be used to reach said participant.

With this information, the communication device can proceed to step 510 to retrieve from an address book a communication identifier and a conferencing type of each communication device identified for the participants in step 508. The address book of the communication device can for example store information about multiple communication devices of each participant (cell phone, house phone, office phone, soft phone, etc.). For each participant, the address book can also have a conferencing type entry for each communication device of the participant. For communication devices of the participants which can only support voice communications, the conferencing type associated with these devices can designate a voice-only device. For communication devices that can support video communications, the conferencing type can designate a capability for video communications.

Since it is possible that not all participants will have video conferencing capability, the communication device can be programmed in step 512 to present the user a list of the participants and the respective capabilities of their communication devices. A sample of this list is shown in FIG. 6 as reference 612. The user can review this list before initiating the call to determine how best to engage with the participants. In one embodiment, for example, the user can select a GUI button shown under the table to engage in video-only communications with participants having this capability (e.g., participants 1 and N). When this selection is made, the communication device can proceed to steps 516 where it identifies the participants capable of video communications (1 and N) and initiates a video-only conference with these participants in step 518. The video-only conference can take place over the communication network of FIG. 2 using a common video conferencing protocol such as H.323.

In another embodiment, the user can request a voice-only communication session. In this instance, the conference all can occur in step 520 with all participants 1 through N, since all parties have communication devices that support voice services. The IMS network 250 of FIG. 2 can support participants with PSTN communication devices and others with VOID communication devices.

In yet another embodiment, the user can choose a hybrid communication session in which some participants are contacted on a video channel, while others are contacted on a voice-only channel. The IMS network 250 can perform the necessary multiplexing tasks so that the communication device can initiate in step 522 a communication session with some participants engaged by voice and video, while others are engaged by voice only.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that a presence system 130 is not utilized. In this embodiment, participants can be called and only those who answer the call are joined to a voice-only, video-only, or hybrid communication session.

Other suitable modifications can be applied to the present disclosure without departing from the scope of the claims below. Accordingly, the reader is directed to the claims section for a fuller understanding of the breadth and scope of the present disclosure.

Figure 7:
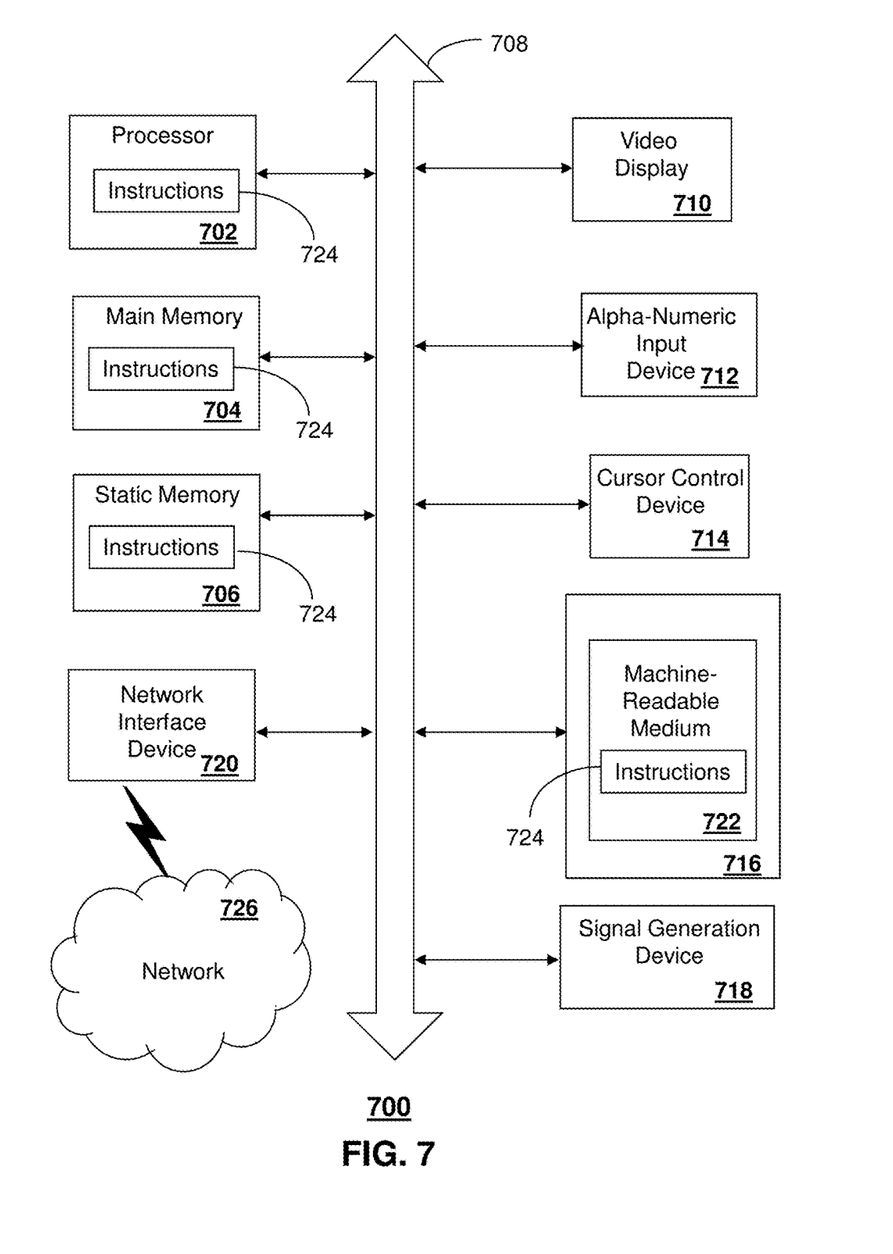
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both)), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, by a processing system including a processor and based on user input at a first communication device, signals indicating selection of a plurality of target participants to engage in a communication session;
    identifying, by the processing system, from presence information retrieved for each of the target participants, a target communication device having a conferencing type indicating whether the target participant can participate in video conferencing or audio-only conferencing;
    presenting, by the processing system, a list of the target participants and the conferencing type for each target communication device, wherein the list includes a plurality of distinct conferencing types, wherein a first set of the target participants is associated with video conferencing and a second set of the target participants is associated with audio-only conferencing;
    receiving, by the processing system based on user input at the first communication device, a selection of a target conferencing type, the selection thereby specifying the target conferencing type prior to initiation of the communication session, the target conferencing type comprising one of audio-only, video-only and audio-video hybrid;
    in accordance with the target conferencing type being the audio-video hybrid, contacting, by the processing system, the first set of the target participants on a video channel and the second set of the target participants on a voice channel; and
    initiating, by the processing system, the communication session with the target communication device of each of the target participants,
        wherein in accordance with the target conferencing type being the audio-video hybrid, an audio-video session is initiated using an IP multimedia subsystem, the IP multimedia subsystem being configured to facilitate services of circuit-switched and packet-switched systems,
        wherein in accordance with the target conferencing type being audio-only, the communication session is initiated with only the first set of the target participants as an audio-only communication session using the voice channel, and
        wherein in accordance with the target conferencing type being video-only, the communication session is initiated with only the first set of the target participants as a video-only communication session using the video channel.

2. The method of claim 1,
    wherein the processing system comprises a base unit in communication with the first communication device, with each target communication device, and with a presence system, and
    wherein the presence information is retrieved from the presence system via the base unit.

3. The method of claim 2, wherein each target communication device communicates with the base unit using a DECT protocol.

4. The method of claim 2, wherein the presence information is retrieved using a WiFi air interface.

5. The method of claim 1, wherein the list of the target participants and the conferencing type for each target communication device is presented via a graphical user interface of the first communication device.

6. The method of claim 5, wherein the first communication device comprises a tablet with a touch-sensitive display.

7. The method of claim 1, wherein the first communication device comprises a video camera for presenting video information via the video channel.

8. The method of claim 1, wherein the first communication device records a calendar event.

9. The method of claim 8, wherein the communication session is initiated responsive to the first communication device detecting a trigger of the calendar event.

10. A device comprising:
a processing system including a processor; and
a memory that stores executable instructions that, when executed by the processing system, facilitate performance of operations, comprising:
receiving, based on user input at a first communication device, signals indicating selection of a plurality of target participants to engage in a communication session;
identifying, from presence information retrieved for each of the target participants, a target communication device having a conferencing type indicating whether the target participant can participate in video conferencing or audio-only conferencing;
presenting a list of the target participants and the conferencing type for each target communication device, wherein the list includes a plurality of distinct conferencing types, wherein a first set of the target participants is associated with video conferencing and a second set of the target participants is associated with audio-only conferencing;
receiving, based on user input at the first communication device, a selection of a target conferencing type, the selection thereby specifying the target conferencing type prior to initiation of the communication session, the target conferencing type comprising one of audio-only, video-only and audio-video hybrid;
in accordance with the target conferencing type being the audio-video hybrid, contacting, by the processing system, the first set of the target participants on a video channel and the second set of the target participants on a voice channel; and
initiating the communication session with the target communication device of each of the target participants,
wherein in accordance with the target conferencing type being the audio-video hybrid, an audio-video session is initiated using an IP multimedia subsystem, the IP multimedia subsystem being configured to facilitate services of circuit-switched and packet-switched systems,
wherein in accordance with the target conferencing type being audio-only, the communication session is initiated with only the first set of the target participants as an audio-only communication session using the voice channel,
wherein in accordance with the target conferencing type being video-only, the communication session is initiated with only the first set of the target participants as a video-only communication session using the video channel, and
wherein the processing system includes a base unit in communication with the first communication device, with each target communication device, and with a presence system.

11. The device of claim 10, wherein the presence information is retrieved from the presence system via the base unit.

12. The device of claim 10, wherein the list of the target participants and the conferencing type for each target communication device is presented via a graphical user interface of the first communication device.

13. The device of claim 10, wherein the first communication device comprises a video camera for presenting video information via the video channel.

14. The device of claim 10, wherein the first communication device records a calendar event.

15. The device of claim 14, wherein the communication session is initiated responsive to the first communication device detecting a trigger of the calendar event.

16. A non-transitory machine-readable medium comprising executable instructions that, when executed by a processing system including a processor, facilitate performance of operations comprising:
receiving signals indicating selection of a plurality of target participants to engage in a communication session;
identifying, from presence information retrieved for each of the target participants, a target communication device having a conferencing type indicating whether the target participant can participate in video conferencing or audio-only conferencing;
presenting a list of the target participants and the conferencing type for each target communication device, wherein the list includes a plurality of distinct conferencing types, wherein a first set of the target participants is associated with video conferencing and a second set of the target participants is associated with audio-only conferencing;
receiving a selection of a target conferencing type, the selection thereby specifying the target conferencing type prior to initiation of the communication session, the target conferencing type comprising one of audio-only, video-only and audio-video hybrid;
in accordance with the target conferencing type being the audio-video hybrid, contacting, by the processing system, the first set of the target participants on a video channel and the second set of the target participants on a voice channel; and
initiating the communication session with the target communication device of each of the target participants,
wherein in accordance with the target conferencing type being the audio-video hybrid, an audio-video session is initiated using an IP multimedia subsystem, the IP multimedia subsystem being configured to facilitate services of circuit-switched and packet-switched systems,
wherein in accordance with the target conferencing type being audio-only, the communication session is initiated with only the first set of the target participants as an audio-only communication session using the voice channel, and
wherein in accordance with the target conferencing type being video-only, the communication session is initiated with only the first set of the target participants as a video-only communication session using the video channel.

17. The non-transitory machine-readable medium of claim 16, wherein the processing system includes a first communication device, and wherein receiving the signals indicating selection of the target participants and receiving the selection of the target conferencing type are based on user input at the first communication device.

18. The non-transitory machine-readable medium of claim 17, wherein the list of the target participants and the conferencing type for each target communication device is presented via a graphical user interface of the first communication device.

19. The non-transitory machine-readable medium of claim 17, wherein the first communication device records a calendar event.

20. The non-transitory machine-readable medium of claim 19, wherein the communication session is initiated responsive to the first communication device detecting a trigger of the calendar event.

* * * * *